M. T. WESTON.
RESILIENT WHEEL.
APPLICATION FILED JULY 3, 1919.

1,431,610.

Patented Oct. 10, 1922.
6 SHEETS—SHEET 6.

INVENTOR

ATTORNEYS

Patented Oct. 10, 1922.

1,431,610

UNITED STATES PATENT OFFICE.

MILTON T. WESTON, OF NEW YORK, N. Y.

RESILIENT WHEEL.

Application filed July 3, 1919. Serial No. 308,578.

*To all whom it may concern:*

Be it known that I, MILTON T. WESTON, a citizen of the United States, residing at New York, county and State of New York, have invented certain new and useful Improvements in Resilient Wheels, of which the following is a specification.

This invention relates to resilient wheels and has for its primary object to provide an improved construction, combination, and arrangement of parts in a resilient wheel whereby the load carrying capacity of such a wheel can be very greatly increased without correspondingly increasing the size of the wheel or tension of the resilient means which may be employed for absorbing the jars and shocks within the wheel itself. In applying the principles of this invention to a wheel by means of a pneumatic tube, it becomes possible to provide a truck wheel of a given load carrying capacity in which the size of the pneumatic tube, the quantity of air contained therein, and the pressure of the air can be greatly reduced as compared to any of the pneumatic tube truck wheels in common use at the present time. It is common practice at the present day to provide truck wheels with pneumatic tires of very large tubular diameter which to withstand the heavy loads to which they are subjected, are commonly filled with air under a pressure of 120 to 150 lbs. per square inch. In consequence of their huge sizes and the heavy loads under which they operate, these tires are peculiarly susceptible to injury when they are met by sharp cornered rocks or other rupturing agencies. The high initial cost of these enormous tires is moreover a very considerable factor in the cost of transportation. According to the present invention, these difficulties are largely if not entirely overcome by subjecting the air in the pneumatic tube to a pressure ranging from 60 to 80 lbs. per square inch, the tube having certain portions flattened in such a way as to provide greatly increased effective pressure areas which are made available for counteracting the relative movements between the axle contacting and tread units of the wheel. Not only is the pneumatic tube protected from the rupturing elements met with on a rough road, but the cushioning action produces only a direct normal pressure on the wall of the pneumatic tube. This holds true for relative angular movements between the wheel units as well as movements into eccentric relation.

This invention also relates to resilient wheels which embody relatively movable hub and tread units of the type shown in my copending application Serial Number 274,024 which was filed January 30th, 1919. One of the objects of the present invention is to increase the leverage whereby the pressure of the pneumatic tube is made to counteract the departure from concentric position of the wheel units shown in said application. In some respects the invention exemplified in the hereinafter described wheel, contemplates a development of the subject matter shown and described in Patent Number. 1,289,586, granted to me on December 31st, 1918, as well as that shown and described in the above identified application. In other aspects, the present invention contemplates certain principles which may be advantageously applied to various types of resilient wheels. One of the objects of the present invention is to provide a pneumatic tube of improved construction which will be adapted to absorb all the shocks and jars or such part of them as are not absorbed when there is an insufficient pressure of air within the pneumatic tube. Another object of the invention is to provide improved means for housing a flattened pneumatic tube in such a way as to greatly increase the total effective pressure areas which are made available for cushioning the relative movements between the wheel units. According to the above identified application, a flexible band was interposed between the inner periphery of the pneumatic tube and a circularly disposed series of caps or anchor shoes and pressure shoes, said caps being mounted on pins or posts carried by the tread unit while the pressure shoes were pivotally connected to the link and lever connections between said units. According to the present invention, this flexible band may be constructed to include rigid pressure plates arranged intermediately to the anchor plates or shoes with interposed sections of link or chain belts which are preferably made up in such a way as to be inflexible in a direction transverse to the central plane of the wheel.

A modified construction of the resilient wheel according to which the pressure shoes are anchored to the fixed posts 12, only by means of their direct attachments to the outer tube or shoe of the pneumatic tube, is shown and described in my copending application Serial No. 560,324, filed May 12th, 1922, claims to such modified construction having been cancelled from the present application under a requirement for division. Certain improvements in construction formerly shown in the present application in connection with the outer periphery of the shoe of the double pneumatic shoe, have been continued in an improved form in my copending application Serial No. 560,325, filed May 12th, 1922.

Another object of the present invention is to provide a lever and link mechanism of improved construction whereby the relative movements between axle and tread units are cushioned or resiliently counteracted by elements which apply their pressure to the wall of the pneumatic tube only in a direction normal thereto.

Another object of the invention is to provide an improved construction and arrangement of parts in the tread unit of a resilient wheel of the character shown and described in my above identified application. Other objects of invention will appear in the specification and be pointed out in the appended claims, reference being had to the accompanying drawings which exemplify my invention in a preferred embodiment and in which:—

Figures 1, 10:
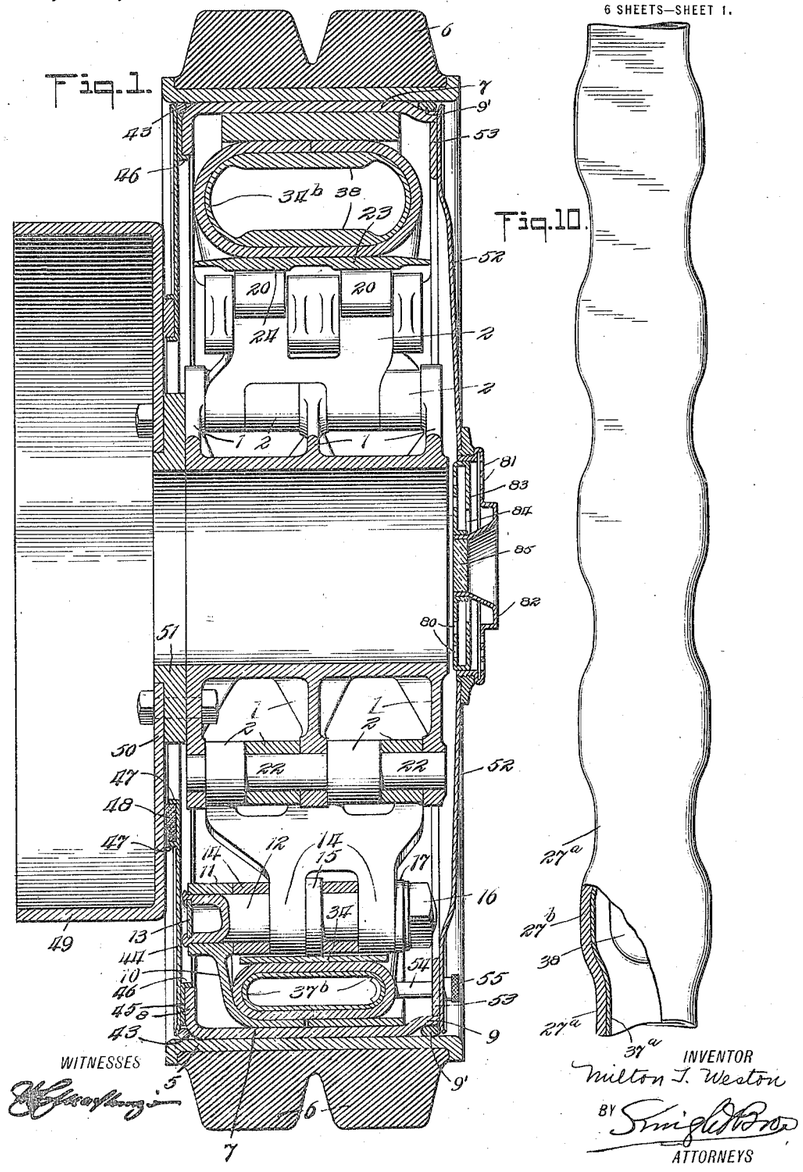
Figure 1 is an axial section of a resilient wheel constructed in accordance with the principles of the present invention.
Figure 10 is a plan development of one embodiment of the pneumatic cushion, parts being broken away and parts shown in section.
Figures 11, 14:
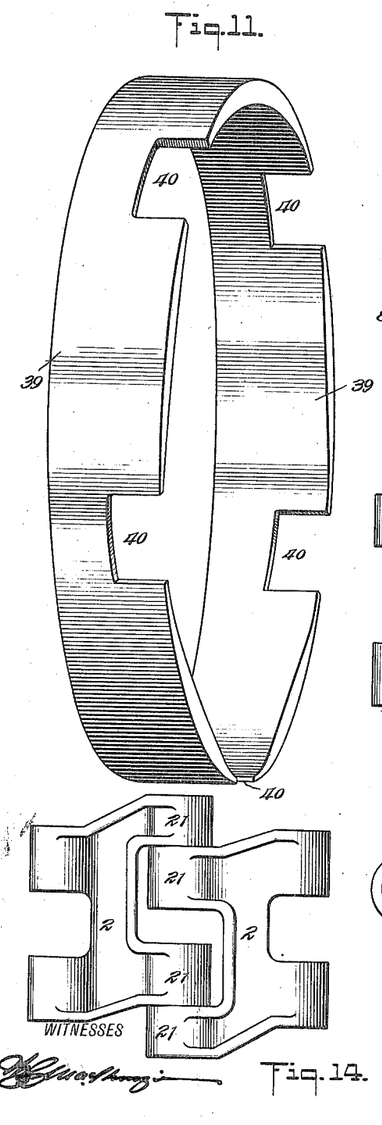
Figure 11 is a perspective view of a packing ring or filler upon which is seated the outer periphery of the pneumatic tube and by means of which the flattened increased effective pressure areas of the tube are inset relatively to the anchored portions of said tube.
Figure 14 is a plan view of one pair of links in extended positions.
Figure 12:
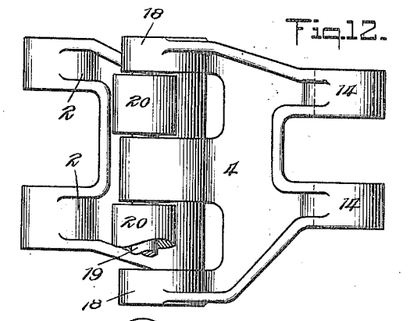
Figure 12 is a plan view of a link and lever connection detached, parts being broken away.
Figure 13:
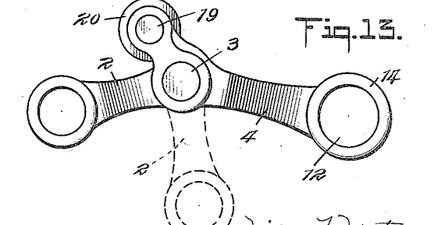
Figure 13 is a side elevation of the same.
Figure 15:
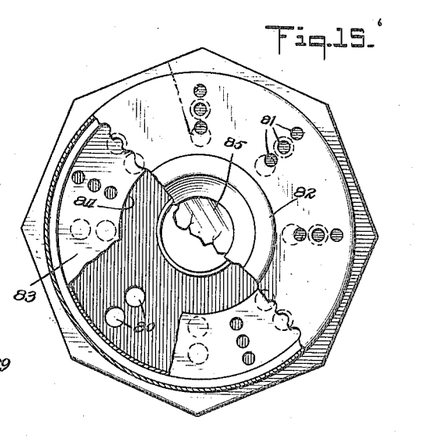
Figure 15 is a side elevation of the ventilating cap, parts being broken away.

Referring more especially to Figures 1, 2, 3 and 4 of the drawings, the embodiment of my invention shown therein, includes a hub or axle contacting unit having bracket arms 1 preferably provided with coaxially arranged bearings in each of said arms. Pivotally mounted near the outer end of each of said bracket arms, is a pair of links 2 which have their outer ends pivotally connected by pins 3 with bent levers 4 which are pivotally mounted, preferably in pairs, on a tread unit. This tread unit, according to Figure 1, comprises a rim 5, a tire 6 (these parts being preferably stock articles from an automobile supply house), and other elements which are now to be described and which constitute a departure from the present known state of the art. Extending around the inner periphery of the rim 5 and secured thereto is a cylindrical band 7 which is provided with an inwardly presented flange 8 on one side and a flange 9 on the other side which is spaced inwardly from the rim 5. According to this embodiment of my invention, a plurality of inwardly presented brackets 10 are arranged in the peripheral corner formed between the cylindrical band 7 and flange 8, said brackets being rigidly secured to both the cylindrical band 7 and flange 8. Each of the brackets 10 is provided with a bearing boss 11 into which a hollow journal pin 12 is driven by hydraulic pressure. As shown in Figure 1, one end of the hollow journal 12 is swaged over on to the circumadjacent portions of the bearing boss 11. A small steel disk 13 may at the same time be swaged into the end of said hollow bearing pin to seal the end of the tube. Journalled upon the hollow journal pin 12 are the divided hub portions 14 of each pair of bent levers 4, the spaced hub portions of each of said levers being disposed to straddle one of the hub portions of the other bent lever. A roller or washer 15 which is larger in diameter than the hubs 14 of levers 4, is interposed between the two inner hub portions 14 for providing a desirable amount of clearance for said hubs 14. These parts are retained in position by means of a nut 16 which is threaded on to the other end of each hollow journal pin 12, a washer 17 being interposed between said nut and the adjacent hub portion 14. Referring now to Figures 12 and 13, it will be seen that each of the bent levers 4 is provided with an angularly disposed arm or extension comprising three laterally spaced branches 18 which carry a pin 19 on which spaced rolls 20 are journalled. In view of the fact that the pin 3 which connects each link 2 to one of the levers 4, is arranged intermediately of the fulcrum 12 and pressure rollers 20 of said lever it will be understood that the effective pressure of the pneumatic tube will operate on a greater leverage than the stress delivered to the lever 4 by link 2. In Figures 12 and 13 link 2 and lever 4 are shown in extreme angular displacement with respect to each other, the normal operating position of link 2 with respect to lever 4 being indicated in dotted lines in Figure 13. The inner split hubs 21 of each pair of links 2, are journalled on a pin 22 mounted in the laterally spaced branches of each radial arm 1. As seen in Figures 1, 12, and 14, the following parts are symmetrically disposed with respect to the central plane of the wheel in such a way as to evenly distribute loads, stresses, and masses sustained by or embodied in the several parts. Rolls 20 are equally distant from and on opposite sides of said plane. The masses of the coaxially journalled hub portions of each pair of links are equalized with respect to said plane. The masses of the coaxially disposed hub portions of each pair of bent levers are equalized with respect to said plane. Finally the mass of each link and bent lever connected thereto when considered as a unit, is equalized with respect to said plane. It will be understood from this description that the bent levers of each pair project in opposite directions from their common axis about which they swing. It will furthermore be apparent from Figure 2 that two pairs of rolls are brought into juxtaposition to operate upon a pressure plate or shoe 23 which is common to these rolls. For this purpose, each of these pressure plates or shoes, is provided with spaced tracks or surfaces 24 on their inner walls. The outer walls of said pressure plates or shoes are provided with lugs 25 which fit into sockets 26 formed in the outer tube or shoe 27 of the pneumatic tube (see Figure 2). Said lugs 25 are adapted to receive screws or studs 28 which may be threaded thereinto and provided with large heads which serve to clamp the pneumatic shoe to the pressure plate or shoe.

Figure 2:
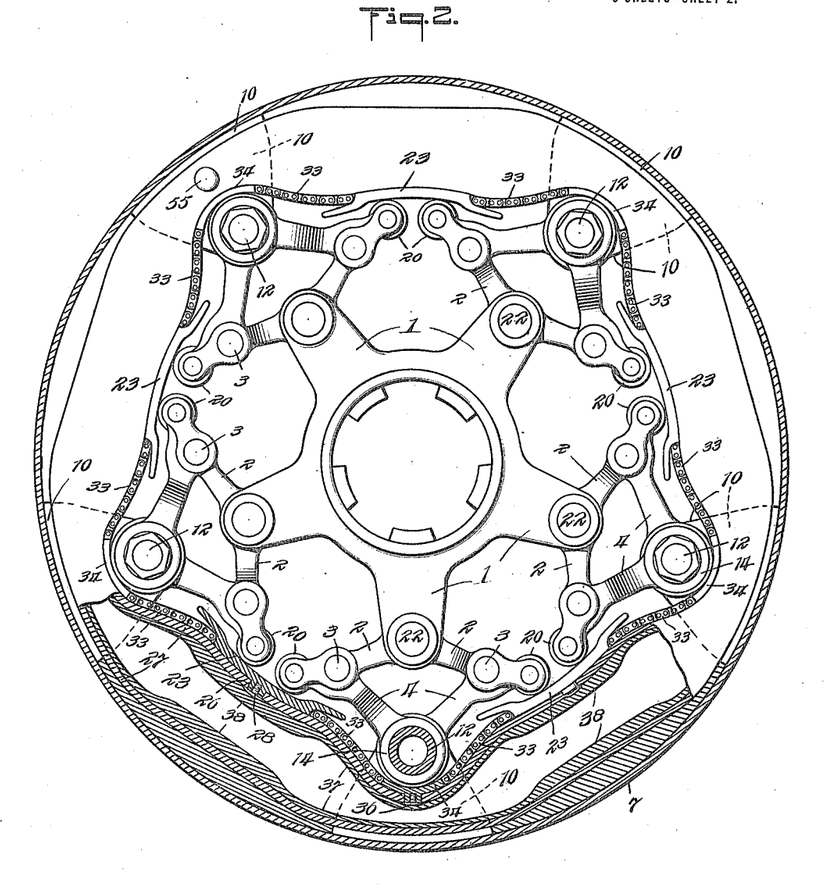
Figure 2 is a side elevation of the interior mechanism of the wheel with the tread units in concentric relation, parts being broken away and parts shown in section.
Figure 3:
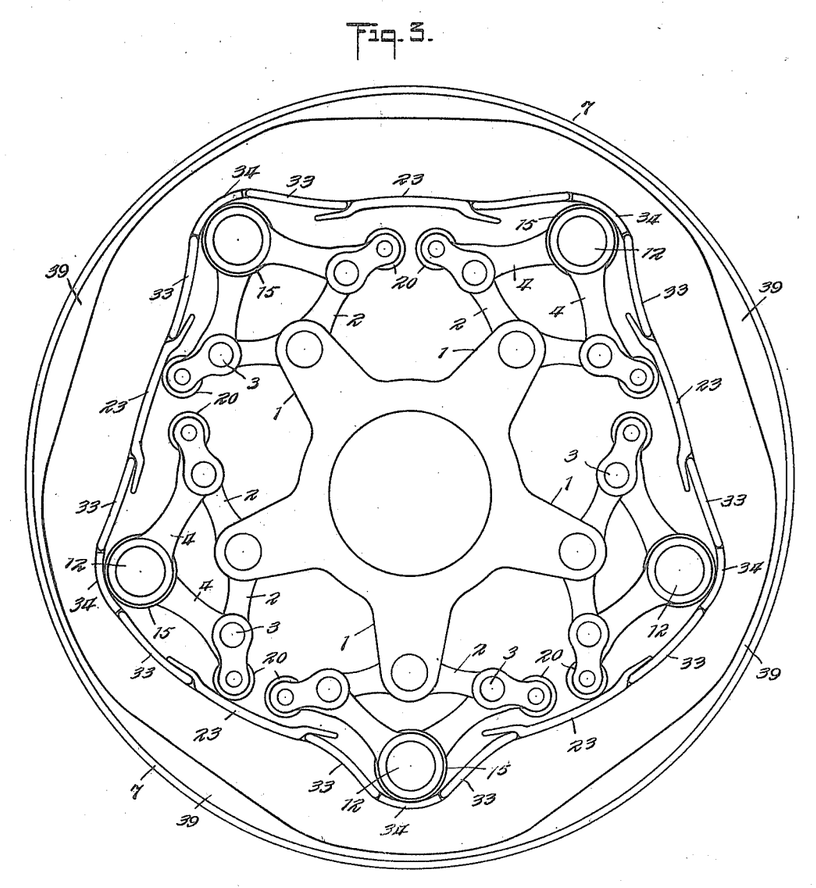
Figure 3 is an outline side elevation of the same showing the relations of the parts when the units are in eccentric relation due to a deflated inner tube.
Figures 5, 6, 7, 8, 9, 16:
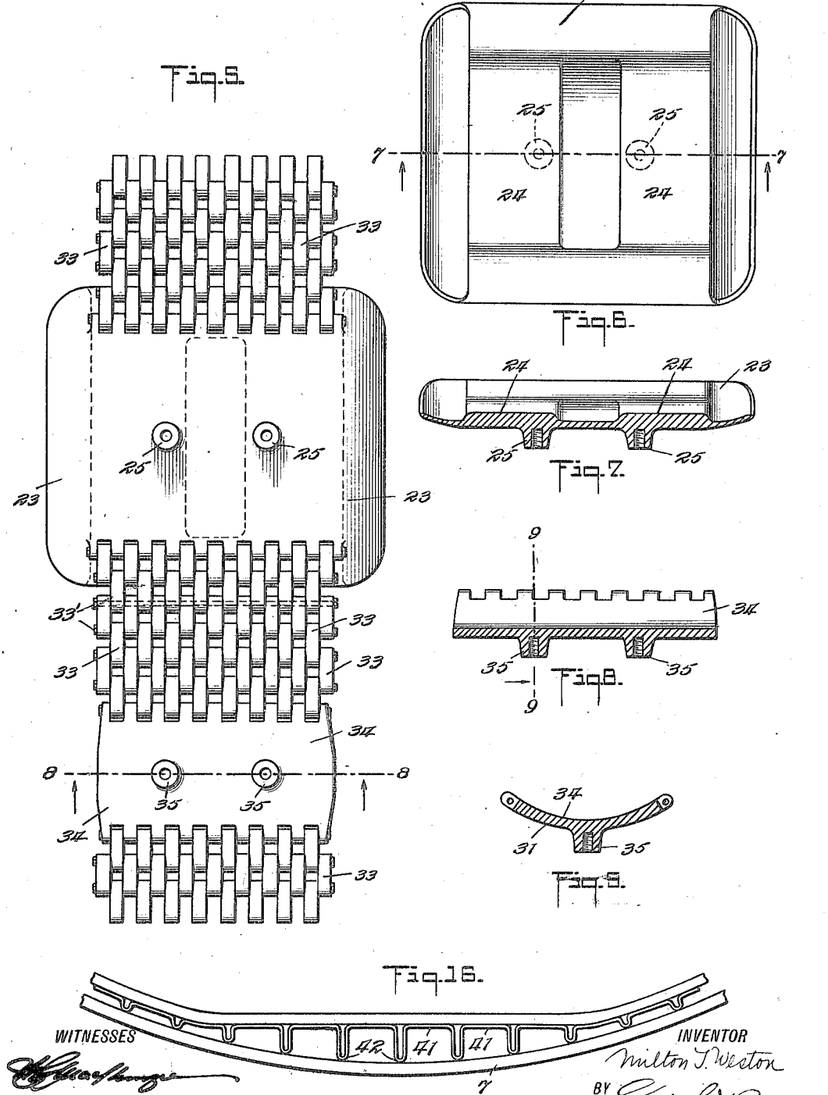
Figure 5 is a plan view from the outside of a portion of the flexible band.
Figure 6 is an inside plan view of one of the pressure plates or shoes.
Figure 7 is a section on the line 7—7, Figure 6.
Figure 8 is a section on the line 8—8, Figure 5.
Figure 9 is a section on the line 9—9, Figure 8.
Figure 16 is a fragmentary side elevation of a preferred embodiment of a ventilating packing element or filler.
Figure 17:
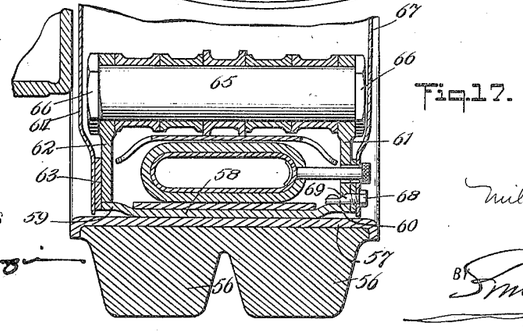
Figure 17 is a transverse section through the rim of a modification.

The pressure plates or shoes 23 are arranged in the angular spaces between the pins 12 upon which the levers 4 are journalled. As shown in Figures 2 and 5, each pressure plate or shoe has opposite edges thereof connected by link or chain belt connections 33 with anchor plates or shoes 34 which extend around the hub portions 14 of the bent levers 4, the necessary clearance for said hubs 14, being provided by the rollers or washers 15 as described above (see Figure 1). One of these anchor plates is shown in Figures 8 and 9, it being provided with lugs 35 adapted to fit into sockets in the pneumatic shoe 27 and to be secured thereto by means of the screws or studs 36 in a manner similar to that for securing the pressure shoes or plates 23. Within the pneumatic shoe 27 is an inner tube 37 provided on opposite walls thereof with pairs of resilient pads or cushions 38 which are arranged in radial alinement with the pressure plates or shoes 23. The pads or cushions are adapted to cooperate in consecutive pairs in cushioning the relative movements between the axle and tread units of the wheel when there is no air pressure in the inner tube. For this purpose and with a view to obviating as far as possible the undesirable results due to the relative movements between adjacent portions of the wall of the pneumatic tube, I have found it very advantageous to provide suitable means for retaining the pressure area sections of the pneumatic in somewhat the form of axially flattened chords in which the pressure element portions of the pneumatic cushions are held in substantial parallelism. By this means the side walls of these portions of the pneumatic tube are largely freed from circumferential curvature within the plane of the wheel (see Figure 2) the curvature therein being substantially confined to the lateral walls of the tube in planes passing through the axis of the wheel and transversely intersecting the pneumatic tube such for example, as shown in the upper half of Figure 1. This object may be accomplished by the device shown detached and in perspective in Figure 11 and in position in Figure 2 and other figures of the drawing. As shown in Figure 11, this device consists of a ring-like structure 39 of wood or other suitable material having its outer periphery suitably formed to fit the inner wall of the band or plate 7 and provided with notches 40 which accommodate the journal holding brackets 10 (see Figure 1). The inner periphery of said packing ring or filler is determined by the amount of inward radial displacement with which it is desired to present the outer pads or cushions 38 with respect to the inner pads or cushions. In this connection, Figure 10 shows in development, a form of pneumatic tube which has been derived from an extended series of trials and experimental use. This pneumatic tube which comprises the outer shoe 27 and the inner tube 37, is composed of alternately arranged anchor and increased pressure area deflection sections, each of the anchor sections 27ª being narrower in width and of less radial depth than each of the increased pressure area sections 27ᵇ. A cross section of the former is shown at the bottom of Figure 1. A cross section of the latter is shown at the top of Figure 1. While the packing ring or filler 39 shown in Figure 11 is adapted to sustain the pneumatic tube in such a way as to present increased effective pressure areas opposite to the pressure shoes or plates 23 which interact between the link and lever mechanism and the inner periphery of the pneumatic tube, it has been found desirable, if not essential, to provide some means for cooling the parts surrounding the pneumatic tube and between it and the rim of the wheel. For this purpose, in place of the solid packing or filling shown in Figure 11, it is preferable to employ a skeletonized form for the same such as that shown in Figure 16 according to which a band 41 of sheet metal is provided with a series of corrugations or double transverse bends to form ribs or supports 42 of varying lengths to correspond to the amounts of displacement applied to different portions of the pneumatic tube. Figure 16 displays this construction throughout the angular interval between two adjacent anchoring points or journal pins 12. From this figure, it will be noted that an air cooled space is provided throughout the entire periphery of the pneumatic tube, said air space being largest adjacent the points at which the link and lever system applies pressure. Referring now to Figure 1, a packing 43 is arranged in the peripheral recess between the outer rim 5 and flange 8 of the band 7. A flat annular plate 44 has its peripheral edge pressed against the packing 43 and is secured in position by spot welding or other suitable means to the flange 8, a ring 45 being interposed between said plate 44 and the flange 8. The inner edge of ring 45 is provided with a flange 46 which fits over the inner peripheral edge of the flange 8. The annular plate 44 is provided around its inner peripheral edge with radially spaced flanges 47 which serve to seat an annular packing strip 48. A brake drum 49 carries an annular flange 50 which is bolted to the spider 1 through an interposed ring 51. Packing 48 bears against said flange 50 of the brake drum 49. On the opposite face of the wheel, a cover plate 52 is in lateral abutment with the inset flange 9 of band 7 and is carried by an annulus 53 to which it may be secured in any suitable manner. Said annulus 53 has its outer peripheral edge seated on the inset flange 9 and is removable with the cover plate 52 to permit access to the interior of the wheel. The annular recess formed between the rim 5 inset flange 9 and the peripheral edge of cover 52, is provided with a packing 9″. A short tube 54 containing an air valve extends through the annulus 53, said tube being anchored within one of the anchored portions of the pneumatic tube and provided with a removable cap 55 on its outer end. In the modification shown in Figure 17, the tire 56 is mounted in a rim 57. Within the rim 57 is disposed a cylindrical band 58 provided with inset lateral edges 59 and 60. Projecting radially inward from the lateral inset portion 60 of the band 58, are bearing brackets 61 which may consist of integral portions of the metal composing the band 58. Coaxially alined with the bearing brackets 61 are oppositely arranged bearing brackets 62 which may be secured in any suitable manner to a flat annulus 63 which abuts laterally against the lateral inset portion 59 of the band 58. A sheet metal wall 64 may be secured to the outer face of annulus 63 in a similar manner. Pins or journals 65 upon which levers for operating upon the inner periphery of the pneumatic tube may be journalled, are secured in the bracket bearings 61 and 62 by means of nuts 66 which are threaded on to the ends of pins or journals 65. A removable sheet metal cover 67 is retained in position by means of nuts 68 on the ends of bolts 69 which are riveted to the inset lateral edge portion 60.

From an inspection of Figure 2 of the drawings it will be understood that the resilient pressure of the pneumatic tube is transmitted to the levers 4 through anti-friction rolls 20 which makes the action on said tube a direct radial force. As the pressure of the pneumatic tube is made effective on the outer ends of the levers 4 while the load stresses transmitted by links 2 to said levers are applied with a much shorter leverage to the pivotal connections 3, a lower pressure of air may be used in the pneumatic tube than would be required by applying the resilient pressure to the pivotal connections as shown and described in my above identified application. It will therefore be understood that not only is a given pressure of air in the pneumatic tube made effective over a greatly enlarged area, but that these larger effective pressure areas due to the flattened sections 27ᵇ of the pneumatic tube, will operate under an increased leverage. The following considerations will make the advantages of this construction obvious. At the present time it is common practice to limit the speed of heavily loaded trucks to 12 miles per hour when they are provided with solid rubber tires. This limitation is necessitated on country roads to avoid undue destruction in car and cargo. To overcome these difficulties and drawbacks, pneumatic tires have been substituted for solid tires, but only by a great increase in the tubular diameters of these tires as well as of the pressure of the air used therein. Not uncommonly, pressure as high as 150 lbs. per square inch has been used in such tires in an effort to prevent the kneading effects upon tires which have increased enormously in cost due to increased amount of material which goes into their manufacture. Moreover, the greatly increased size of the pneumatic tire, makes it more liable to strike obstructions or rough corners and lessens its power of resisting injury from such causes. To overcome these difficulties the present invention contemplates a hidden pneumatic tube of relatively small size which is permanently flattened to provide an increased pressure area in place of an increased pressure of air, and the application of the total pressure derived from such increased area to a relatively large leverage for counteracting load stresses impressed on a relatively small leverage. In flattening the tube to increase the available air pressure, it will be obvious that the tube will occupy less room radially than a round tube, a feature which renders the present invention more readily adaptable to a truck wheel. According to the embodiment of my invention shown in Figures 1 to 20 inclusive, the pneumatic tube is flattened throughout its circumference although it varies in width at points as well as in radial depth. In this connection a band is interposed between the pneumatic tube and the several pressure plates or shoes 23, said band being radially flexible but transversely inflexible. Included in this band and extending across the intervals between the anchoring plates or shoes 34 and pressure plates or shoes 23, are the link belt or chain link sections 33 of which the pintles 33′ extend throughout the width of the flattened tube. By means of this construction, the inner periphery of the pneumatic tube is prevented from bulging across the intervals extending between the anchor and pressure shoes, these sections of the tube being permitted to yield radially but supported rigidly in a transverse direction to avoid the compound flexures which would otherwise occur over these intervals.

Figure 4:
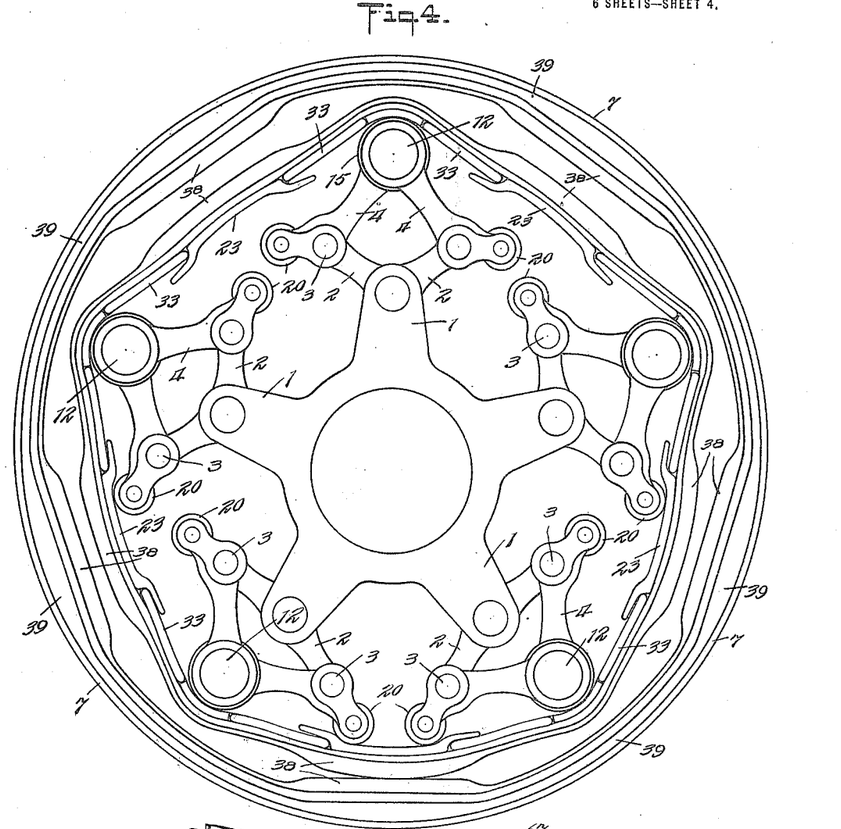
Figure 4 is a side elevation transverse to the axis, showing the relative positions of the parts with the pneumatic tube collapsed.

A collapse of the pneumatic tube is provided for by the resilient cushions or pads 38 which are arranged in opposed pairs in radial alinement with the pressure plates or shoes 23 and which as shown in Figure 4 are adapted to cushion the relative movements between the axle and tread units as the wheel rolls on. Means for suitably supporting the outer series of these pads for the purpose of reducing the radial play between the paired pads or cushions, are provided by the packing block or filler shown in Figure 11 which however to afford proper ventilation or cooling, is preferably made in the skeletonized form shown in Figure 16 which permits the cooling air to pass around the pneumatic tube and between it and the cylindrical band 7. The air which thus cools the heated tube and surrounding parts is agitated in the interior of the wheel by means of the relative movements between the wheel units. As shown in Figure 1 the annular cavity within which the tube and parts operating thereon, are disposed, is in open communication with the atmosphere by means of ports or openings 80 in an inner wall and similar ports or opening 81 in an outer wall of a cap 82 at the hub of the wheel. In order to prevent the admission of water to the interior space of the wheel, an intermediate wall or partition 83 is provided with a central opening 84 which makes an indirect passageway between the ports or openings 80 and 81. At the same time the intermediate wall or partition 83 forms a water trap between it and the outer wall of the cap so that any water which becomes entrapped therein may drain therefrom by means of those ports or openings 81 which may be below the axis of the wheel. The advantages of the peculiar form of pneumatic tube which is preferably employed, are obvious. Large bodies of air are provided at those points at which the relative movements of the wheel units are cushioned. Between these points the pressures are equalized by way of the contracted openings around the anchor plates or shoes, the circulation of the air within and without the pneumatic tube serving for an efficient and rapid dissipation of the heat created in the wheel. It will be observed from an inspection of Figure 1 that by removing the cover plate 52 with its attached ring 53, the pneumatic tube when deflated, may be readily placed in position or removed thereof.

I claim:

1. A wheel comprising axle and tread units, a series of levers pivoted to one of said units, links pivotally connecting the respective levers with the other unit, a pneumatic tube suitably disposed to oppose the movement of said levers due to relative displacement of said units, and pressure plates interposed between said pneumatic tube and the bearing portions of said levers.

2. A wheel comprising axle and tread units, a series of levers pivoted to one of said units, links pivotally connecting the respective levers with the other unit, a pneumatic tube suitably disposed to oppose the movement of said levers due to relative displacement of said units, pressure plates interposed between said pneumatic tube and the bearing portions of said levers, and means for movably anchoring said pressure plates to one of said units.

3. A wheel comprising axle and tread units, a series of levers pivoted to one of said units, links pivotally connecting the respective levers with the other unit, a pneumatic tube suitably disposed to oppose the movement of said levers due to relative displacement of said units, pressure plates interposed between said pneumatic tube and the bearing portions of said levers, and means for anchoring said pressure plates at points adjacent the pivotal axes of said levers.

4. A wheel comprising axle and tread units, means for movably connecting said units, resilient means operating on said connecting means for resisting relative movement between said units, peripherally spaced pressure plates interposed between said resilient means and said connecting means and means for anchoring said pressure plates.

5. In a resilient wheel, relatively movable axle and tread units, a pneumatic tube, means for connecting said units, said connecting means having portions resisted in their movements by said pneumatic tube, and a band interposed between the pneumatic tube and said bearing portions of the connecting means, said band including alternately arranged pressure portions and flexible connection portions.

6. In a resilient wheel, relatively movable axle and tread units, a pneumatic tube, means for connecting said units, said connecting means having portions resisted in their movements by said pneumatic tube; and a band interposed between the pneumatic tube and said bearing portions of the connecting means, said band including alternately arranged pressure portions and flexible connection portions, said connecting portions of the band being provided with means for rendering them transversely inflexible.

7. In a resilient wheel, tread and axle units, a pneumatic tube, means movably connecting said units and having bearing portions, and a band interposed between said pneumatic tube and said bearing portions of the connecting means, said band comprising pressure plates in operable engagement with said bearing portions, anchor plates anchored to one of said units, and link belts connecting said pressure plates to said anchor plates.

8. In a resilient wheel, a tread unit provided with axially extending supports spaced from the outer periphery of said tread unit, a pneumatic tube extending circumferentially between said supports and the periphery of said tread unit, anchoring plates mounted on said supports, pressure plates arranged around the inner periphery of said pneumatic tube and within the angular spaces between said supports, means for connecting said pressure plates to said anchoring plates, an axle contacting unit, and means for movably connecting said tread and axle contacting units, said connecting means including portions operatably engaging said pressure plates.

9. In a resilient wheel a tread unit provided with an axially flattened seat, a pneumatic tube having its outer periphery axially flattened on said seat, a band extending around the inner periphery of said pneumatic tube, said band comprising axially flattened pressure plates spaced peripherally and axially flattened connections extending between said pressure plates, an axle contacting unit, and means for connecting said units, including levers pressure on said bearing plates.

10. In a resilient wheel, a tread unit provided with an axially flattened seat, a pneumatic tube having its outer periphery axially flattened on said seat, a band extending around the inner periphery of said pneumatic tube, said band comprising axially flattened pressure plates spaced peripherally and axially flattened connections extending between said pressure plates, an axle contacting unit, and means for connecting said units, including levers pressure on said bearing plates, said pneumatic tube being provided with oppositely disposed pads on the inner wall of said tube in substantial radial alinement with each of said pressure plates.

11. In a resilient wheel, relatively movable axle contacting and tread units, one of said units being provided with a circumferential seat, a pneumatic tube bearing against said seat, said pneumatic tube being provided with bearing pads arranged in radial pairs on the interior wall of said tube, and means for movably connecting said units, said means bearing against said tube in the radial lines of said pads.

12. In a resilient wheel, relatively movable axle contacting and tread units, a pneumatic tube seated on one of said units, said pneumatic tube having flattened portions, means movably connecting said units and adapted to be counteracted in their movements by said flattened portions, and pressure plates interposed between said flattened portions and said units connecting means.

13. In a resilient wheel, relatively movable axle contacting and tread units, a pneumatic tube seated on one of said units, said pneumatic tube having flattened portions, means movably connecting said units and adapted to be counteracted in their movements by said flattened portions, and pressure plates interposed between said flattened portions and said units connecting means, said connecting means comprising levers pivotally mounted on one of said wheel units, and links pivotally connecting said levers to the other of said wheel units, said levers having extensions bearing upon said pressure plates.

14. In a resilient wheel, axle contacting and tread units, a pneumatic tube for cushioning the relative movements between said wheel units, said tube being provided with flattened portions, a seat carried by one of said wheel units for supportably engaging said pneumatic tube, pressure plates in contact with the flattened portions of said tube opposite to said seat, and links and levers movably connecting said wheel units, said levers having bearing engagement with said pressure plates.

15. In a resilient wheel, axle contacting and tread units, one of said units being provided with a seat for supportably engaging a pneumatic tube, a pneumatic tube bearing on said seat, angularly spaced pressure plates arranged around said pneumatic tube and opposite to said seat, links and levers movably connecting said units, said levers movably engaging said pressure plates, anchor plates arranged adjacent the pivotal axes of said levers, and link mats flexibly connecting the pressure plates to said anchor plates and supportably engaging the pneumatic tube.

16. In a resilient wheel, axle contacting and tread units, one of said units being provided with a seat for supportably engaging a pneumatic tube, a pneumatic tube bearing on said seat, angularly spaced pressure plates arranged around said pneumatic tube and opposite to said seat, links and levers movably connecting said units, said levers movably engaging said pressure plates, anchor plates arranged adjacent the pivotal axes of said levers, and link mats flexibly connecting the pressure plates to said anchor plates and supportably engaging the pneumatic tube, said pneumatic tube having its inner wall provided with pairs of oppositely disposed cushioning pads radially alined with respect to said pressure plates.

17. A pneumatic tube comprising spaced deflection sections connected by interposed anchoring sections, said deflection sections being provided with flattened increased pressure areas adapted to be supported by the air pressure in said tube for resisting pressure applied to said pressure areas from without the tube.

18. A pneumatic tube comprising a series of spaced, deflection sections inter-connected through a series of similarly spaced communicating sections, the said deflection sections being adapted to be deflected towards each other against the resistance of the air pressure in said tube, and being provided with flexible pads on the interior wall thereof, nominally out of contact with each other, but coacting against each other under abnormal deflections, the length of the said pads being limited to said deflection sections of the said tube.

19. In a resilient wheel, a rim provided with a tread on its outer periphery and a pneumatic tube seated against its inner peripheral surface, an axle contacting unit, levers pivotally supported from said rim and bearing against the wall of said pneumatic tube, and links for connecting said levers to said axle contacting unit.

20. In a resilient wheel, a rim having its inner peripheral surface adapted to seat the outer periphery of a pneumatic tube, a pneumatic tube having its outer periphery seated thereon, brackets mounted on the inner periphery of said rim and conforming to the outer periphery of said pneumatic tube, pins mounted in said brackets, levers pivoted on said pins and exerting pressure on the inner periphery of said pneumatic tube, an axle contacting unit, and links connecting said axle contacting unit to said levers.

21. In a resilient wheel, a rim provided on its outer periphery with a tread and on its inner periphery with a seat for the outer periphery of a pneumatic tube, an axle contacting unit, links connecting said axle contacting unit to said levers, and brackets for pivotally mounting said levers, said brackets having portions conforming to the wall of said pneumatic tube and by means of which said brackets are secured to said rim.

22. In a resilient wheel, the combination with a tread unit provided with an inwardly presented seat for a pneumatic tube, said seat having portions thereof arranged nearer to the axis of said tread unit than other portions, a pneumatic tube mounted on said seat, an axle contacting unit movable relatively to said tread unit and links and levers movably connecting said units, said levers exerting pressure on portions of said pneumatic tube disposed opposite to those portions of the seat which are arranged nearer to the axis of said tread unit.

23. In a resilient wheel, a rim provided with a tread, a cylindrical band extending around the inner periphery of said rim, circumferentially spaced brackets mounted along one edge of the inner peripheral wall of said cylindrical band, levers pivotally mounted on said brackets and having their hub portions spaced inwardly from said cylindrical band, said band being provided with a seat for the outer periphery of a pneumatic tube, a pneumatic tube having its outer periphery bearing on said seat and its inner periphery anchored to said brackets, and resisting the movements of said levers, an axle contacting unit movable relatively to said rim, links connecting said axle contacting unit to said levers, and a cover plate abutting laterally against the lateral edge of said cylindrical band and disposed within the inner periphery of said cylindrical band.

24. In a resilient wheel, the combination with a tread unit provided with an inwardly presented seat, a pneumatic tube mounted on said seat, an axle contacting unit movable relatively to said tread unit, and means movably connecting said units, said tread unit being provided with channels for cooling medium extending around said pneumatic tube.

25. In a resilient wheel, the combination with a tread unit provided with an inwardly presented seat for a pneumatic tube, a pneumatic tube mounted on said seat, an axle contacting unit movable relatively to said tread unit, and means movably connecting said units, said tread unit having a sheet metal band having corrugations formed therein and extending around the inner circumference of said tread unit to provide a ventilated seat for said pneumatic tube.

26. In a resilient wheel, the combination with a tread unit provided with an inwardly presented seat, a pneumatic tube mounted on said seat, an axle contacting unit movable relatively to said tread unit, and means movably connecting said units, said wheel having closed lateral walls provided with ventilating openings in open communication with said cooling channels.

27. In a resilient wheel, relatively movable tread and axle contacting units, means for movably connecting said wheel units, and resilient means for counteracting the relative movements between said units, said connecting means comprising levers pivotally mounted on one of said wheel units, and links pivotally connecting said levers to the other of said wheel units, said levers being provided with portions extending beyond their pivotal connections with said links and bearing on said resilient means.

28. In a resilient wheel, a tread unit, an axle contacting unit, a pneumatic tube having angularly spaced portions anchored to one of said units, levers and links for movably connecting said units, said levers exerting pressure on said pneumatic tube intermediately of the anchored portions thereof, and means mounted on the interior wall of said pneumatic tube and intermediately of said anchored portions for cushioning the relative movements of said units.

29. In a resilient wheel a tread unit, a hub unit, a pneumatic tube having circumferentially spaced portions anchored to one of said units, levers pivotally mounted on one of said units and exerting pressure on said pneumatic tube intermediately of said anchored portions, and links pivotally connecting said levers to the other of said units, said pneumatic tube being provided with flattened pressure area portions opposed to the thrust of said levers and elliptical cross sections between said increased pressure area portions and said anchored portions.

30. In a resilient wheel, a tread unit, a hub unit, a pneumatic tube having circumferentially spaced portions anchored to one of said units, levers pivotally mounted on one of said units and exerting pressure on said pneumatic tube intermediately of said anchored portions, and links pivotally connecting said levers to the other of said units, said pneumatic tube being provided with flattened pressure area portions opposed to the thrust of said levers and elliptical cross sections between said increased pressure area portions and said anchored portions, said pneumatic tube being provided with axially extended pressure plates interposed between it and said levers.

31. In a resilient wheel, relatively movable hub and tread units, a pneumatic tube having contracted portions circumferentially spaced for anchoring it to one of said units, anchoring plates or shoes interengaging between said unit and said contracted portions, pressure plates or shoes mounted on said pneumatic tube intermediately of said anchoring plates or shoes, said tube having flattened area portions cooperating with said pressure plates or shoes and elliptical cross sections between said pressure plates or shoes and said anchoring plates or shoes, and links and levers for movably connecting said units, said levers bearing on said pressure plates or shoes.

32. In a resilient wheel, a rim provided with an outwardly presented tread, circumferentially spaced bearing brackets mounted on and presented inwardly from said rim, levers journalled in said brackets, a pneumatic tube anchored to said tread unit adjacent the journalling axes of said levers, said levers exerting pressure on said pneumatic tube, a hub unit, and links pivotally connected to said hub unit and levers.

33. In a resilient wheel, a tread unit, circumferentially spaced bearing brackets presented inwardly from said tread unit, levers journalled in said brackets, a pneumatic tube anchored to said tread unit adjacent the journalling axes of said levers, said levers exerting pressure on said pneumatic tube, a hub unit, links pivotally connected to said hub unit and levers, anchoring plates or shoes interposed between said pneumatic tube and the hubs of said levers, and means for spacing said anchoring plates or shoes from the hubs of said levers.

34. In a resilient wheel, a tread unit including a rim, circumferentially spaced bearing brackets presented inwardly along one edge of said rim, laterally projecting pins mounted at one end in said bearing brackets, levers journalled on said pins, a pneumatic tube movable laterally into and out of position between said levers and said rim, an axle contacting unit, and links connecting said levers to said axle contacting unit.

35. In a resilient wheel, a tread unit including a rim, a pneumatic tube seated on the inner circumference of said rim, circumferentially spaced brackets projecting inwardly from said rim, pins mounted in said bearing brackets, levers journalled on said pins, and bearing on the inner periphery of said pneumatic tube, an axle contacting unit, and links connecting said levers to said axle contacting unit.

36. In a resilient wheel, a tread unit including a rim, inwardly presented circumferentially spaced brackets mounted along one edge of said rim, laterally projecting pins mounted in said bearing brackets, levers journalled on said pins, a pneumatic tube seated on the inner circumference of said rim between said levers and said rim, an axle contacting unit, and links connecting said levers to said axle contacting unit.

37. In a resilient wheel, a tread unit including an outer tread containing rim, inwardly presented bearing brackets circumferentially spaced adjacent one edge of said rim, laterally projecting pins mounted at one end in said bearing brackets, levers journalled on said pins, a pneumatic tube substantially filling the space between said levers and said rim, an axle contacting unit, and links connecting said levers to said axle contacting unit.

38. In a resilient wheel an axle contacting unit having a closed cylindrical wall adjacent its axis, a tread unit having a closed cylindrical rim, means for forming a dust tight closure for one side of the annular space formed between said cylindrical wall and rim, means disposed within said annular space for movably connecting said wheel units, a pneumatic tube disposed within said annular space for counteracting the relative movements between said wheel units, means for providing for the circulation of air around said pneumatic tube, and a cover fitting within the rim on its outer edge, said cover being provided with a hub cap comprising a plurality of walls with openings forming air channels between said annular space and the outside atmosphere.

39. A resilient wheel comprising an axle contacting unit, a tread unit, a pneumatic tube extending between said units, means articulately connecting said units and operated upon by said pneumatic tube, and a band interposed between said articulate connecting means and said pneumatic tube, said band being flexible only along lines parallel to the axes of said units.

40. In a resilient wheel, relatively movable axle contacting and tread units, a pneumatic tube for cushioning the relative movements between said units, and means movably connecting said units and bearing against said pneumatic tube, said pneumatic tube being provided with cushioning means on the interior wall thereof and arranged to resist the pressure exerted by said connecting and bearing means upon said pneumatic tube.

41. In a resilient wheel, a tread unit, an axle contacting unit, a pneumatic tube, levers and links for movably connecting said units, said levers bearing against said pneumatic tube, and cushioning means mounted on the interior wall of said pneumatic tube for cushioning the movements of said levers during relative movements between said units.

MILTON T. WESTON.